May 26, 1953  J. REYKLIN  2,639,797
MARGIN STOP ASSEMBLY
Filed March 23, 1948
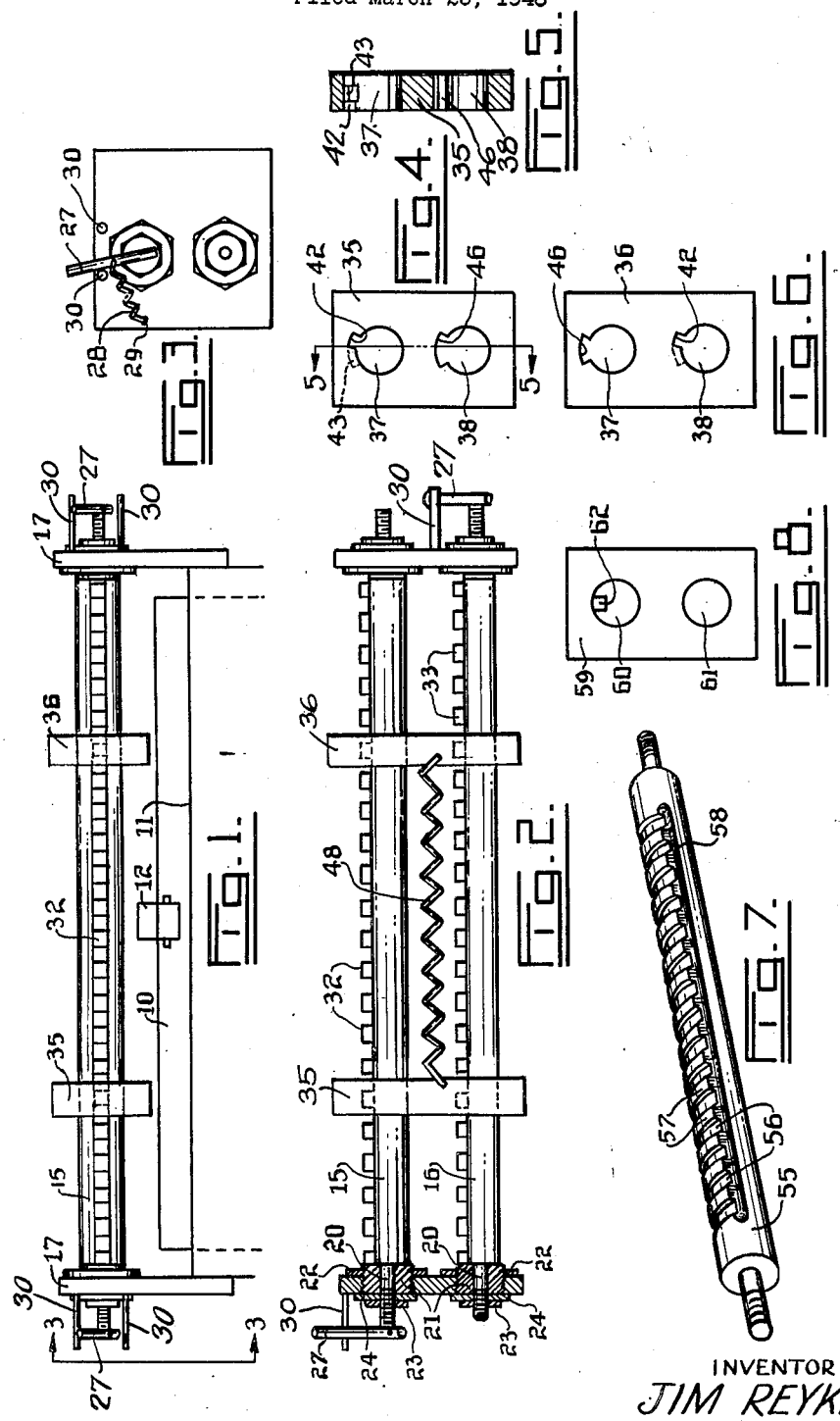
INVENTOR
JIM REYKLIN
BY
Fetherstonhaugh & Co.
ATTORNEYS Patented May 26, 1953

2,639,797

UNITED STATES PATENT OFFICE 2,639,797

MARGIN STOP ASSEMBLY

Jim Reyklin, New Westminster, British Columbia, Canada

Application March 23, 1948, Serial No. 16,491

7 Claims. (Cl. 197—63)

This invention relates to margin stop assemblies for typewriters.

An object of the present invention is the provision of a margin stop assembly which may be made as a unit and mounted on any type of typewriter.

Another object is the provision of an automatic margin stop assembly with which it is only necessary to release the margin stop and then move the typewriter carriage to the desired position in order to determine the size of the margin, after which the stop is locked in place.

A further object is the provision of an automatic margin stop assembly which is extremely simple in construction, which may be easily operated, and which is very unlikely to go out of working order.

This margin stop assembly may be constructed so that a margin may be set up at one side only of a sheet, usually the left side. However, it is preferable to construct it so that a margin may be set up at both sides of the sheet. A pair of parallel round locking rods are provided along with means for rotatably supporting them on and parallel with the carriage of a typewriter. Each of these rods is formed with a plurality of spaced aligned teeth radiating therefrom. At least one or, preferably, two margin stops are slidably mounted on the rods over the teeth thereof, said stops being adapted to be engaged by a carriage stop on the typewriter. Resilient means is provided for normally urging the margin stops towards each other. Means is provided on each margin stop for removably engaging the teeth of one of the rods to lock said stop thereon, each stop being engageable with a different rod than the other one. Each of the rods may be individually rotated to release the stop engaged therewith, and then rotated again to reengage the stop.

Other objects and features of the invention will appear from the accompanying description with reference to the drawings, in which:

Figure 1 is a plan view of the stop assembly,

Figure 2 is a front elevation thereof,

Figure 3 is an end view,

Figure 4 is a side view of one of the margin stops,

Figure 5 is a section taken on the line 5—5 of Figure 4,

Figure 6 is a side view of the other margin stop,

Figure 7 is a perspective view of an alternative locking rod, and

Figure 8 is a side view of a margin stop for the rod of Figure 7.

Referring more particularly to the drawings, 10 diagrammatically illustrates the back portion of the frame of a typewriter, and 11 diagrammatically illustrates the carriage thereof, see Figure 1. A carriage stop 12 of the usual construction is mounted on the frame 10 at the back thereof substantially midway between the sides of the typewriter. This stop may be releasable in the usual manner.

A pair of round locking rods 15 and 16 are placed close to and parallel with each other. These rods may have any relationship to each other, but in this example of the invention, one is placed above the other. Suitable means is provided for rotatably supporting the rods on and parallel with the carriage 11 of a typewriter. One way of doing this is by means of brackets 17 located at the opposite ends of the rods and secured to the carriage in any convenient manner. All the ends of the rods 15 and 16 are mounted in the same manner, and, therefore, only one will now be described in detail. Each end of each rod is provided with a reduced portion 20 rotatably mounted in a bushing 21 which is threaded into one of the brackets 17. A nut 22 locks the bushing in place in the bracket, while lock nuts 23 and 24 retain the reduced portion 20 in position. The nut 24 bears only lightly against the bracket 17 so that the rod is free to turn in the bushing. An operating lever 27 is provided at one end of each rod, and suitable spring means may be provided for resiliently holding the rod in one position. A spring 28 may be provided for this purpose, one end of said spring being connected to a lever 27 and the opposite end anchored to the bracket 17, as at 29, see Figure 3. Stops 30 are provided for limiting the turning movement of the rod.

The rods 15 and 16 are provided with spaced aligned teeth 32 and 33. These teeth extend throughout the length of their respective rods and, in this form of the invention, are located on the tops of said rods.

Margin stops 35 and 36 are slidably mounted on the rods 15 and 16. Each stop is provided with circular openings 37 and 38 which are just large enough to accommodate the rods 15 and 16, respectively. The opening 37 of stop 35 and the opening 38 of stop 36 are each provided with a slot 42 radiating therefrom and extending completely through the stop. One or more recesses 43 are formed in the stop and communicate with the slot 42. Each slot 42 is of a size sufficient to permit the teeth of the rod to move therethrough, whereas the recess or recesses 43 are located at an angle to the slot 42 and are adapted to receive one or more of the rod teeth. With this arrangement, when a rod is turned so that its teeth register with the slot 42, the stop may be moved along the rod. On the other hand, when the rod is turned so that its teeth engage with the recess 43, the stop is locked on the rod. The springs 28 normally retain the rods with their teeth engaging the recesses 43 of the two stops.

The opening 38 of the stop 35 and the opening 37 of the stop 36 are each provided with a slot 46 radiating therefrom which is large enough to permit the teeth of a rod to move therethrough regardless of the setting of the rod. Thus, each stop may be locked on one rod but it is always free of the other one. In this example, the stop 35 may be locked on the rod 15, whereas the stop 36 may be locked on the rod 16.

Suitable resilient means is provided for normally urging the stops 35 and 36 towards each other and away from the ends of the rods. This means may consist of a spring or elastic 48 which extends from one stop to the other, as clearly shown in Figure 2. This spring or elastic may be supported only by the stops, as shown, or the central portion thereof may be anchored to one or both of the rods.

The carriage stop 12 projects between the margin stops 35 and 36 so that the latter may engage the former when the carriage is moved sufficiently toward one side or the other of the typewriter. When it is desired to set the left hand margin on a page in the typewriter, the rod 15 is rotated by means of the lever 27 to release the stop 35. The spring 48 will draw the stop to the right until it contacts the carriage stop 12. Now it is only necessary to move the carriage 11 to the right until it reaches the position where the typing would start at the desired position on the paper. The rods 15 and 16 move with the carriage, but the stop 35 cannot, owing to its contact with the stop 12. When the carriage reaches the desired position, the rod 15 is rotated to re-engage the margin stop. Thus, the margin stop is quickly and conveniently moved to the correct position. In order to form the right hand margin, the same thing is done in connection with the margin stop 36. In this case, the rod 16 is rotated by means of its lever 27 to release said margin stop, and then the carriage is moved to the left to the desired position, after which the rod is rotated to re-engage the margin stop.

The margin assembly according to this invention is a complete and compact unit and, therefore, it may be mounted on the carriage of any typewriter. The rods 15 and 16 and their operating levers 27 are completely free of the machine, and the power for the margin stops 35 and 36, namely the spring 48, is also free of the typewriter. Most typewriters are provided with a carriage stop 12, but if it is desired to mount this assembly on a typewriter that has not any such stop or has not one in the right position, it is a simple matter to mount one at the desired point on the typewriter frame.

The alternative of Figures 7 and 8 is similar to that of the other figures, with the exception that the teeth of the locking rods and the margin stops are reversed. In Figures 1-6, the teeth project outwardly from the locking rods, whereas the margin stops have one or more recesses 43 adapted to receive these teeth. Actually, the recesses 43 form teeth which engage with the rod teeth.

In Figure 7, a locking rod 55 is formed with a plurality of spaced grooves 56 which form therebetween radiating aligned spaced teeth 57. A groove 58 extends longitudinally of the rod and communicates with the ends of the grooves 56. A margin stop 59 is provided having circular openings 60 and 61 through which the locking rods extend. One of these, in this case the opening 60, is provided with one or more inwardly-projecting teeth 62 adapted to fit into the grooves 56 of the locking rod.

With this arrangement, the tooth or teeth 62 normally engage the teeth 57 of the locking rod so that the margin stop cannot move thereon. When the rod is rotated, the groove 58 moves into line with the tooth or teeth 62 so that the stop may now move along the rod. When the stop has reached the desired point, the rod is rotated to re-engage the margin stop thereon.

What I claim as my invention is:

1. A margin stop assembly for typewriters comprising a pair of parallel round rods each having a plurality of spaced aligned teeth radiating therefrom, means for rotatably supporting the rods on and parallel with the carriage of a typewriter, two margin stops slidably mounted on the rods over the teeth thereof adapted to be engaged by a carriage stop of the typewriter, and means on each margin stop for removably engaging the teeth of one of the rods to lock said stop thereon, each margin stop being engageable with a different rod than the other one, and said rods being individually rotatable to release their stops.

2. A margin stop assembly for typewriters comprising a pair of parallel round rods each having a plurality of spaced aligned teeth radiating therefrom, means for rotatably supporting the rods on and parallel with the carriage of a typewriter, two margin stops slidably mounted on the rods over the teeth thereof adapted to be engaged by a carriage stop of the typewriter, resilient means normally urging the margin stops towards each other, and means on each margin stop for removably engaging the teeth of one of the rods to lock said stop thereon, each margin stop being engageable with a different rod than the other one, and said rods being individually rotatable to release their stops.

3. A margin stop assembly for typewriters comprising a pair of parallel round rods each having a plurality of spaced aligned teeth radiating therefrom, means for rotatably supporting the rods on and parallel with the carriage of a typewriter, two margin stops slidably mounted on the rods over the teeth thereof adapted to be engaged by a carriage stop of the typewriter, resilient means normally urging the margin stops towards each other, and internal teeth in each margin stop for removably engaging the teeth of one of the rods to lock said stop thereon, each margin stop being engageable with a different rod than the other one, and said rods being individually rotatable to separate the teeth and release the stops.

4. A margin stop assembly for typewriters comprising a pair of parallel rods, means for rotatably supporting the rods on and parallel with the carriage of a typewriter, two margin stops slidably mounted on the rods adapted to be engaged by a carriage stop of the typewriter, resilient means connecting the stops and normally urging them towards each other, and means co-acting between each margin stop and one of the rods to lock the former on the latter, each of said rods being rotatable to release the stop co-acting therewith.

5. A margin stop assembly for typewriters comprising a rod member, means for rotatably supporting the rod member on and parallel with the carriage of a typewriter, a margin stop member slidably mounted on the rod member adapted to be engaged by a carriage stop of the typewriter, resilient means normally urging the stop member away from one end of the rod member, means fixed on one member movable through a slot in the other member when the stop member is moved along the rod member, and means fixed on the opposite member for engaging the fixed means on the other member when the rod member is rotated to lock the margin stop member on the latter.

6. A margin stop assembly for typewriters comprising a rod, means for rotatably supporting the rod on and parallel with the carriage of a typewriter, a margin stop slidably mounted on the rod adapted to be engaged by a carriage stop of the typewriter, resilient means normally urging the stop away from one end of the rod, spaced aligned teeth on and extending longitudinally of the rod, a slot in the margin stop through which the teeth pass when the latter is moved along the rod, and a recess within the margin stop at an angle to and opening into the slot therein for receiving a rod tooth when the rod is rotated to lock the margin stop on said rod.

7. A margin stop assembly for typewriters comprising a rod, means for rotatably supporting the rod on and parallel with the carriage of a typewriter, a margin stop slidably mounted on the rod adapted to be engaged by a carriage stop of the typewriter, resilient means normally urging the stop away from one end of the rod, spaced aligned teeth on and extending longitudinally of the rod, a slot extending longitudinally of the rod and communicating with the spaces between the teeth, and a tooth on the margin stop which rides in the rod slot when the former is moved along the latter and fits into a space between the rod teeth when the rod is rotated to lock the margin stop on the latter.

JIM REYKLIN.

References Cited in the file of this patent

UNITED STATES PATENTS

| Number | Name | Date |
|---|---|---|
| 567,799 | Webb | Sept. 15, 1896 |
| 605,264 | Webb | June 7, 1898 |
| 2,303,065 | Prezioso | Nov. 24, 1942 |